June 21, 1960     J. C. CHUPA     2,941,805
TETHER BALL STRUCTURE
Filed Jan. 17, 1957
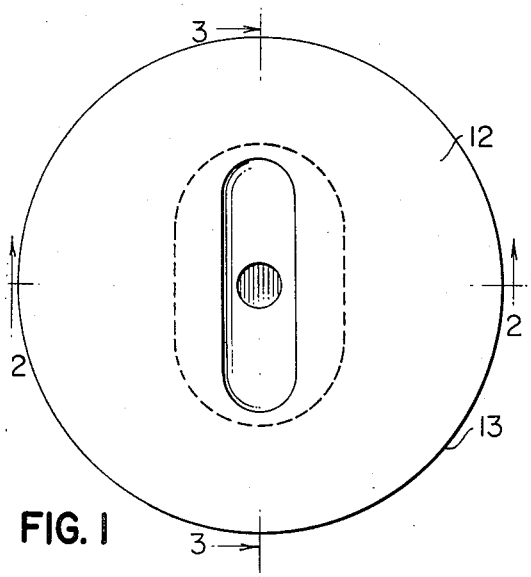
FIG. 1
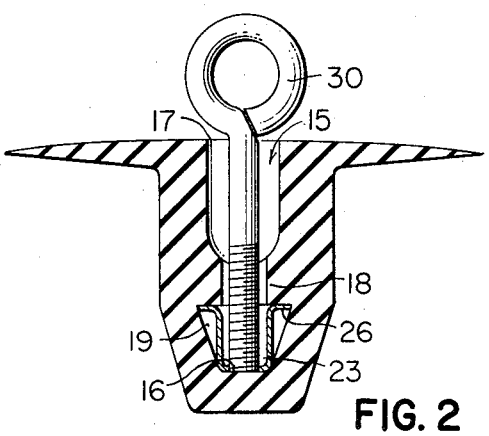
FIG. 2
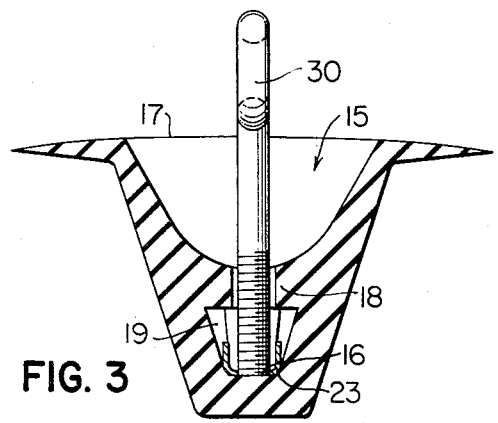
FIG. 3
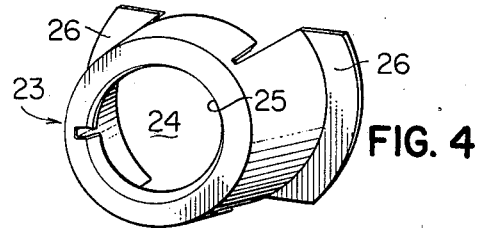
FIG. 4
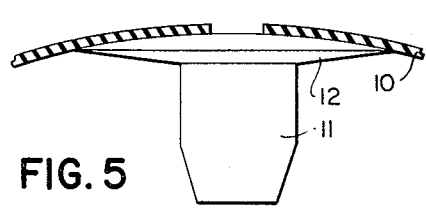
FIG. 5
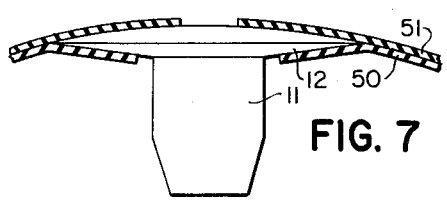
FIG. 6
FIG. 7
FIG. 8
INVENTOR.
JOHN C. CHUPA
BY *Ely, Pearne + Gordon*
ATTORNEYS

United States Patent Office 2,941,805
Patented June 21, 1960

2,941,805

TETHER BALL STRUCTURE

John C. Chupa, Sandusky, Ohio, assignor to The Barr Rubber Products Company, Sandusky, Ohio, a corporation of Ohio Filed Jan. 17, 1957, Ser. No. 634,657

2 Claims. (Cl. 273—58)

This invention relates to tether balls and more particularly to inflatable tether balls and to the means for latching inflatable tether balls to a rope or similar flexible line.

The invention applies to tethered athletic balls, net floats, sewer balls and the like, and the term "tether ball" as used herein applies to all such balls regardless of the particular application in which they are used.

Another object of the invention is to provide a tether ball wherein the latching means is strong and durable and yet does not involve the necessity of pre-molding embedded hardware comprising parts made of metal or the like with any of the molded or cast sections comprising the ball. An additional object of the invention is to accomplish the provision of such a tether ball wherein all the elastomeric parts may be completely formed prior to combining therewith the latching hardware, if any, which hardware comprises elements which are made of metal or the like.

It is to be understood that the term "elastomeric" as used herein includes all those materials which are adapted for fabrication into tether balls or into the air envelopes, valve housings, latch housings or the like which tether balls comprise, including the several natural and artificial rubbers known to the art as well as plastisols such as the vinyl plastisols and also other materials of like or similar properties.

Another object of the invention is to provide for an interlock or interengagement between latching hardware and an elastomeric latch mounting by elements which coact as snubbing means in a manner which will more clearly appear below.

A further object of the invention is to provide an alternative ball structure whereby latching hardware is embedded within the molded or cast body of the ball but which would not involve pre-molding to accomplish such embedding.

A further object of the invention is to provide tether ball structures with the above advantages and which are easier and less costly to manufacture than those of the prior art.

These and additional objects and advantages of the invention will become more fully apparent from the following description of examples of the invention in which reference is made to the accompanying drawings. In the drawings:

Figure 1 is a plan view of latch means which may be employed in tether ball structure according to the present invention, the main portion of the ball body being omitted for purposes of clarity.

Figure 2 is a section taken on line 2—2 in Figure 1.

Figure 3 is a section taken on line 3—3 in Figure 1.

Figure 4 is an isometric drawing, on an enlarged scale, of a nut which is preferably employed in the hardware of the latching means according to the present invention.

Figures 5 through 7 are fragmentary views, partly in section and on a reduced scale, illustrating several tether ball structures embodying the invention.

Figure 8 is a sectional, fragmentary view of another tether ball structure embodying the invention, this view being taken on a scale slightly smaller than that of Figures 1 through 3.

Shown in Figure 5 is a fragmentary view of a tether ball structure in which the ball body 10 is bonded to the outer face of a latch housing 11 of molded rubber or any other suitable elastomer. The body 10 and housing 11 may be bonded together in any conventional or suitable manner. The housing 11 is preferably formed with a surrounding flange 12, the boundary 13 of which may be circular, as shown in Figure 1. The housing 11 is formed as by molding to define within itself a chamber generally indicated at 15. The chamber 15 has an inner closed end 16 and an outer open end 17 communicating with the exterior of the ball. The housing 11 is also formed to define means such as the shoulder 18 which projects laterally into the chamber 15. The shoulder 18 is in spaced relationship to the inner closed end 16 and therefore there is defined an inner chamber portion 19 within the chamber 15. The chamber portion 19 will be seen to constitute a re-entrant portion of the chamber 15.

A nut 23 which has been inserted through the opening within the shoulder 18 is positioned within the chamber portion 19. The dimensions and properties of the structure allow this to be accomplished, taking into account the resiliency or flexibility of the shoulder 18 as well as the dimension of the opening through the shoulder 18. It will be understood that the opening in the illustrated example is not large enough to admit the nut without distortion. A form of nut 23 which is preferably used according to the invention is shown in Figure 4. This nut may be stamped in a cup shape with an opening 24 at the bottom of the cup. The opening has a spiral edge 25 which terminates at two axially spaced ends which form the leading and trailing edges for threaded engagement of the nut with a bolt. During threaded engagement, the edge 25 lies along the root of the thread on the bolt with which it is engaged. The upper end of the cup is provided with outwardly extending flanges 26. Those who are familiar with fasteners will recognize this nut as a known type of stamped nut. Furthermore, it is to be emphasized that this particular form of nut is illustrated as a preferred practice according to the present invention and that other nuts, such as square or hexagonal nuts of standard or elongated dimensions or circular nuts or nuts tapered or stepped or otherwise varied in conformation or cross-section from one end to the other, can be perfectly appropriate to the invention.

Threadedly received by the nut 23 is a bolt 30 having an eye at its outer end. The rope or line to which the ball is to be tethered is passed through the eye of the bolt and is tied to itself or is knotted at its end to prevent its withdrawal through the eye, or it is otherwise fastened to the bolt 30. It may be most convenient to accomplish such fastening after the hardware comprising the nut 23 and the bolt 30 is anchored within the latch housing 11, or such fastening may be accomplished prior to the anchoring of the hardware within the latch housing.

In the drawings, the parts are shown in the position or condition which obtains prior to complete turning down of the bolt 30 into the nut 23. When the bolt 30 is turned down into the nut 23, the outer end of the nut (the flanges 26 in the illustrated case) engage the shoulder 18, and the bolt 30 engages against the inner closed end 16. This causes the chamber portion 19 to elongate which, in turn, causes the walls of the chamber portion 19 to draw inwardly and snub the sides of the nut to effect a firm snubbing engagement between the latch housing and the latch hardware. The latch hardware and the latch housing are thus strongly interconnected despite the resiliency or flexibility of the material comprising the latch housing and without the pre-molding of embedded hardware within the material comprising the latch housing.

A housing such as the housing 11 may be included in a tether ball structure such as that shown in Figure 6. Here the ball body 40 underlies and is bonded to the flange 12 and is cut out around the main bulk of the housing 11. The periphery of the flange 12 is preferably feathered into the wall 40. In balls comprising laminated or multiple-ply stock, it may be desirable to anchor a housing, such as the housing 11, between certain of the several laminations or plies. For example, in Figure 7 there is shown an envelope comprising the plies 50 and 51. A housing 11 is provided, and the flange 12 of this housing is bonded to both the inner ply 50 and the outer ply 51. The inner ply 50 is cut out around the main bulk of the housing 11 and is bonded to the inner face of the flange 12. The outer ply 51 passes over the outer face of the housing 11 and is bonded thereto, a cut-out being formed in the outer ply at the location of the chamber 15, as shown.

The latch housings 11 may be bonded to the ball bodies with which they are associated in a suitable manner. As used herein the term "bonding" includes adhering, welding, fusion, simultaneous casting of the valve body and latch housing, and any other joining structure or operation appropriate to the subject matter of the invention. For example, the invention may be embodied in the tether ball structure shown in Figure 8. The ball shown in Figure 8 may be formed by rotational casting of elastomers which lend themselves to that manufacturing method, such as vinyl plastisols and the like. The housing 56 is formed simultaneously with the formation of the ball body 55, the plastisol charge clinging to and setting on the surface of a pin projecting from the wall of the mold as well as on the remainder of the extent of the mold walls. Thus, the housing 56 is formed with the pin on which it is formed causing a chamber to be defined within the housing 56. This chamber is generally indicated at 58 and will be seen to correspond to the chamber 15. The chamber portion 57 will be seen to correspond to the chamber portion 19. One method of making a housing integral with a ball, which housing has a chamber therein communicating with the exterior of the ball, is shown in U.S. Patent 2,760,775.

It is not in all respects essential to the present invention that the latch housing project into the body of the ball with which it is associated. In some applications it may be preferable to have the latch housing extend outwardly from the ball body.

In general, it is to be understood that the particular means of bonding or structurally associating the latch housing and the ball body is not material to the teaching of the present invention; however, various alternatives in this respect have been set forth above at some length in an effort to preclude any unfortunate and unfounded immaterial limitation of the scope of the invention disclosed and claimed herein.

It will be appreciated that forms of the invention which presently appear to be preferable have been illustrated and described in this specification. Obviously, modifications and alterations differing slightly or even radically in appearance from those herein described will occur to others on seeing this specification or other disclosures of the invention, such as commercial embodiments thereof. It is intended to include all such modifications and alterations insofar as they come within the scope of the following claims.

What is claimed is:

1. A tether ball comprising an elastomeric ball body, an elastomeric latch housing on said body, said latch housing being formed to define within itself a chamber having an inner closed end and an outer open end communicating with the exterior of the ball and also to define means projecting laterally into said chamber in spaced relationship to said inner closed end whereby an inner chamber portion is defined within said chamber, a bolt extending into said inner chamber portion from the exterior of the ball, a nut within said inner chamber portion and threaded on said bolt, said bolt being turnable in said nut to vary the depth of penetration of said bolt within said housing, said nut being engageable against said projecting means while said bolt engages against said inner closed end to cause stretching and narrowing of said inner chamber portion upon further turning of said bolt down into said nut to thereby result in said inner chamber portion coming into snubbing interrelationship with said nut.

2. A tether ball comprising an elastomeric ball body, an elastomeric latch housing on said body, said latch housing being formed to define within itself a chamber having an inner closed end and an outer open end communicating with the exterior of the ball and also to define a shoulder projecting laterally into said chamber in spaced relationship to said inner closed end whereby an inner chamber portion is defined within said chamber, a bolt extending into said inner chamber portion from the exterior of the ball, a nut within said inner chamber portion and threaded on said bolt, said bolt being turnable in said nut to vary the depth of penetration of said bolt within said housing, said nut being engageable against said projecting means while said bolt engages against said inner closed end to cause stretching and narrowing of said inner chamber portion upon further turning of said bolt down into said nut to thereby result in said inner chamber portion coming into snubbing interrelationship with said nut.

References Cited in the file of this patent

UNITED STATES PATENTS

| | | |
|---|---|---|
| 830,581 | Fleischman | Sept. 11, 1906 |
| 859,378 | Fleischman | July 9, 1907 |
| 2,199,858 | Racicot | May 7, 1940 |
| 2,653,817 | Tebbetts | Sept. 29, 1953 |

FOREIGN PATENTS

| | | |
|---|---|---|
| 768,636 | France | May 22, 1934 |
| 511,261 | Great Britain | Aug. 15, 1939 |
| 314,026 | Switzerland | July 14, 1956 |